(No Model.)

F. P. ZIEGLER.
THILL COUPLING.

No. 519,489. Patented May 8, 1894.

Witnesses.
O. N. Keeney
Anna C. Faust

Inventor.
Frank P. Ziegler
By Benedict & Morsell
Attorneys.

THE NATIONAL LITHOGRAPHING COMPANY,
WASHINGTON, D. C.

UNITED STATES PATENT OFFICE.

FRANK P. ZIEGLER, OF MILWAUKEE, WISCONSIN.

THILL-COUPLING.

SPECIFICATION forming part of Letters Patent No. 519,489, dated May 8, 1894.

Application filed August 28, 1893. Serial No. 484,177. (No model.)

*To all whom it may concern:*

Be it known that I, FRANK P. ZIEGLER, of Milwaukee, in the county of Milwaukee and State of Wisconsin, have invented a new and useful Improvement in Thill-Couplings, of which the following is a description, reference being had to the accompanying drawings, which are a part of this specification.

My invention consists of the device hereinafter described and its parts, or their equivalents.

Figure 1:
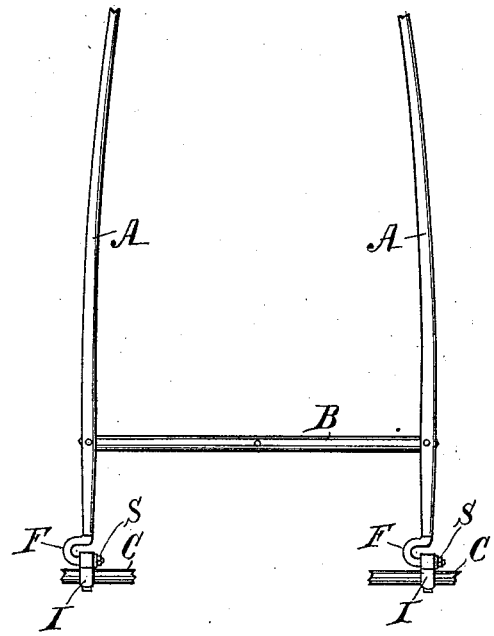
Figure 2:
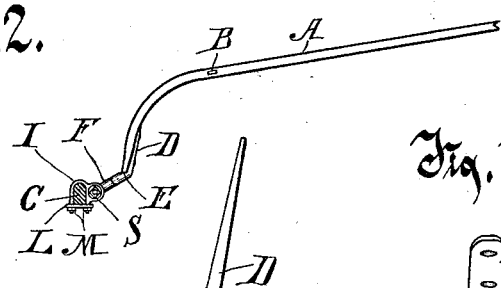
Figure 3:
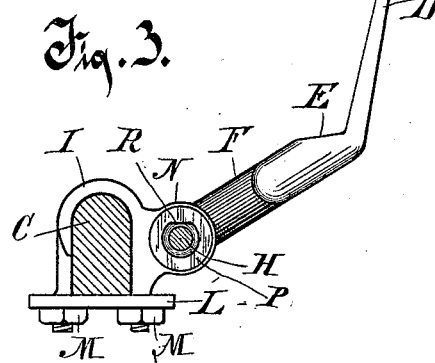
Figure 4:
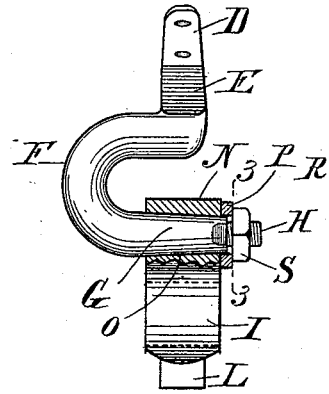

In the drawings, Figure 1, is a plan of a pair of thills connected by means of my improved device to an axle of a vehicle, of which axle only fragments are shown. Fig. 2, is a side elevation of a thill with my improved device, by which it is connected to an axle, shown in cross section. Fig. 3, is an enlarged view of my improved device, shown in elevation, the securing nut being omitted. Fig. 4, is a top plan view of the same device shown in Fig. 3, parts being broken away to show interior construction.

In the drawings, A A are a pair of thills connected together near their rear extremities by a cross bar B.

For connecting the rear extremities of the thills A to the axle C, I provide duplicate devices, one for each thill. These devices consist each of a thill iron formed with a shank D, adapted to fit snugly against the under surface of the thill A, a shoulder E adapted to receive the end of the thill against it, a laterally curved neck F, a truncated or circular tapering bearing part G and a terminal central reduced and screw threaded part H. The complementary part of the device consists of the clip I placed about the axle C and secured thereto by the plate L and the nuts M turning on the extremities of the clip against the plate, the clip being provided with a forwardly projecting part or ear N provided with a transverse circular tapering eye O parallel with the axle, adapted to receive therein the tapering bearing part of the thill iron. The clips I are duplicates the one of the other, the eye O in both tapering in the same direction. The tapering bearing part G of the thill iron fits snugly but revolubly in the eye of the clip. The circular bearing part G of the thill iron is slightly greater in diameter at that end which is the continuation of the curved neck F, than the diameter of the eye O at that side and the bearing part G of the thill iron tapers correspondingly with the eye O, extending slightly beyond the other side of the clip. A washer P is placed on the extremity of the bearing part G that projects beyond the clip, the washer being held in place against revolution on the thill iron by a straightened or faced part R which fits on a correspondingly faced part of the extremity of the bearing part G. A nut S turns on the contracted part H against the washer P interposed between the nut and the side of the clip. This washer is thicker than the length of that portion of the bearing part G that projects on that side beyond the clip, so that the strain of the nut against the washer and against the clip draws the bearing part G tightly into the eye O. By this means the wear is taken up and all play and rattling of the parts is obviated, while the thill iron is permitted to rotate to such extent as is required, in the eye of the clip. If the bearing part G and the complementary part of the clip become so worn that the part G projects from the clip for a greater distance than the thickness of the washer P, another washer somewhat thicker than this one may be substituted in place thereof. It will be seen that as these thill irons are both turned in the same direction, being in all respects a duplicate one of the other, the thills may be readily removed from the vehicle to which they are attached by releasing the nuts S, and that they may be as readily replaced and secured in position, by the reverse operation. It will also be observed that the shape of the thill iron, particularly by reason of the curved neck F, is such that the thill is directly in front of the clip I, and that therefore the pull or strain of the thills on the axle is directly through or in line of the clips, and is in no wise an oblique or cross strain.

What I claim as my invention, and desire to secure by Letters Patent, is—

1. A thill coupling, comprising a clip having means by which it is secured to an axle, which clip is provided with a forwardly projecting ear having a transverse circular aperture tapering its entire length from one side of the clip to its opposite side, and a thill iron comprising a tang by which the iron is secured to the thill, a medial laterally curved neck, a circular tapering bearing part disposed at a right angle to and in the line of the extension of the thill, said tapering bearing part being longer than the eye or tapering aperture in the clip in which it is fitted, a diametrically contracted screw-threaded extension of the thill iron beyond the bearing part, a nut turning on the screw-threaded extension, a washer fitted loosely on and projecting somewhat beyond the outer extremity of the tapering bearing part of the thill iron and between the nut and the side of the clip, said washer having an interior straight or faced part fitting a complementary flat face on the side of the tapering bearing part at and near its outer extremity, whereby the washer is prevented from rotation on the thill iron, substantially as described.

2. A thill coupling comprising a clip adapted to be secured to an axle, which clip has a forwardly projecting part provided with a transverse circular tapering aperture parallel with the axle, and a thill iron having a shank formed to be secured to a thill, a laterally extending medial neck, a circular tapering bearing part arranged substantially at a right angle to the thill but in the line of an extension thereof and parallel to the axle, said tapering bearing part being somewhat longer than the transverse aperture in the clip which receives the tapering bearing part of the thill iron fitted therein, a nut turning on the contracted extremity of the thill iron, and a washer on and movable along the thill iron interposed between the clip and the nut, substantially as described.

In testimony whereof I affix my signature in presence of two witnesses.

FRANK P. ZIEGLER.

Witnesses:
C. T. BENEDICT,
A. L. MORSELL.